United States Patent [19]

Massimo

[11] Patent Number: 4,777,777
[45] Date of Patent: Oct. 18, 1988

[54] CONNECTING ARRANGEMENT FOR PANELS

[75] Inventor: Galli Massimo, Massa, Italy

[73] Assignee: Olivetti Synthesis, S.p.A., Turin, Italy

[21] Appl. No.: 902,708

[22] Filed: Sep. 2, 1986

[30] Foreign Application Priority Data

Sep. 19, 1985 [IT] Italy ................. 67791 A/85

[51] Int. Cl.$^4$ ............................................. E04C 1/10
[52] U.S. Cl. ........................ 52/586; 403/294; 403/331
[58] Field of Search ............. 52/584, 585, 586, 238.1, 52/239, 396, 829; 403/294, 331, 381

[56] References Cited

U.S. PATENT DOCUMENTS

| | | | |
|---|---|---|---|
| 2,924,858 | 2/1960 | Couse et al. | 52/586 |
| 3,363,383 | 1/1968 | Barge | 52/584 X |
| 3,592,289 | 7/1971 | Aysta | 52/586 X |
| 3,603,049 | 9/1971 | Pierce | 52/586 X |
| 3,759,005 | 9/1973 | Smith | 52/829 X |
| 3,872,642 | 3/1975 | Felix | 52/586 X |
| 4,103,465 | 8/1978 | McDonald, Jr. | 52/586 X |
| 4,488,833 | 12/1984 | Perry et al. | 52/586 X |

FOREIGN PATENT DOCUMENTS 1106751  3/1968  United Kingdom ................. 52/585

Primary Examiner—Carl D. Friedman
Attorney, Agent, or Firm—Banner, Birch, McKie & Beckett

[57] ABSTRACT

The connecting arrangement is applied to each of two panels to be joined and has a lateral upright comprising at least one hollow support which extends over the entire length of the upright. Each support defines a substantially cylindrical seat and a passage which extends to the outside, which are respectively capable of accommodating a cylindrical portion and a web of a shaped connecting member. The member can be removably slid in with the portions thereof in the seats of two hollow supports of two contiguous panels. The connecting member is made in one piece from plastics material and the web may be flat or curved at variable angles. This permits the arrangement of contiguous panels in a coplanar configuration, at 90° to each other or at 120° to each other. The connecting member may be fixed in place after it has been slid in by members blocking the ends of the sets.

3 Claims, 3 Drawing Sheets

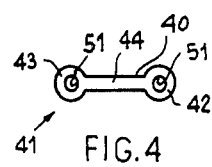
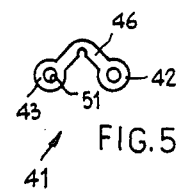
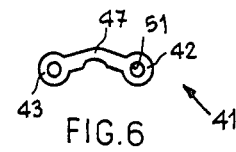
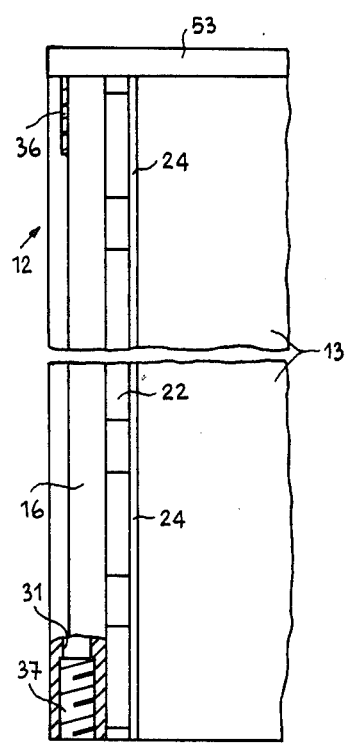
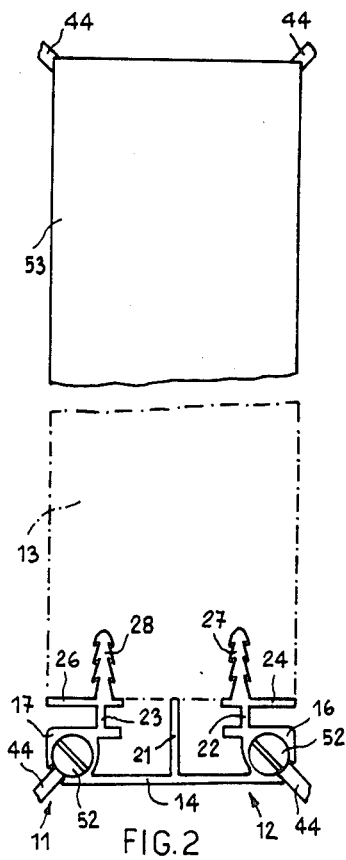

CONNECTING ARRANGEMENT FOR PANELS

BACKGROUND OF THE INVENTION

The present invention relates to a connecting arrangement for panels comprising two lateral uprights which are respectively fixed to two of the panels.

A connecting arrangement for panels is known, comprising a hinge with two bar portions and spring blocking means, which is capable of being mounted and fixed to the shaped edges of two contiguous panels. That arrangement is practical and functional but suffers from the disadvantage of leaving a gap between the two panels and not defining in a stable form the configuration as between the actual panels.

SUMMARY OF THE INVENTION

The object of the present invention is to provide a connecting arrangement for panels which is simple, reliable and aesthetically acceptable and which is at the same time quick and easy to assemble and of low cost.

The connecting arrangement for panels according to the invention is characterised by the characterising portion of the main claim.

BRIEF DESCRIPTION OF THE DRAWING

A preferred embodiment of the invention is set forth by the following description which is given by way of non-limiting example with reference to the accompanying drawing in which:

FIG. 2 is a second plan view of part of the arrangement according to the invention, FIG. 3 is a longitudinal view of part of the arrangement shown in FIG. 2, FIG. 4 is a plan view of a first connecting element of the arrangement according to the invention, FIG. 5 is a plan view of a second connecting element of the arrangement according to the invention, FIG. 6 is a plan view of a third connecting element of the arrangement according to the invention.

DESCRIPTION OF THE PREFERRED EMBODIMENT

Figure 1:
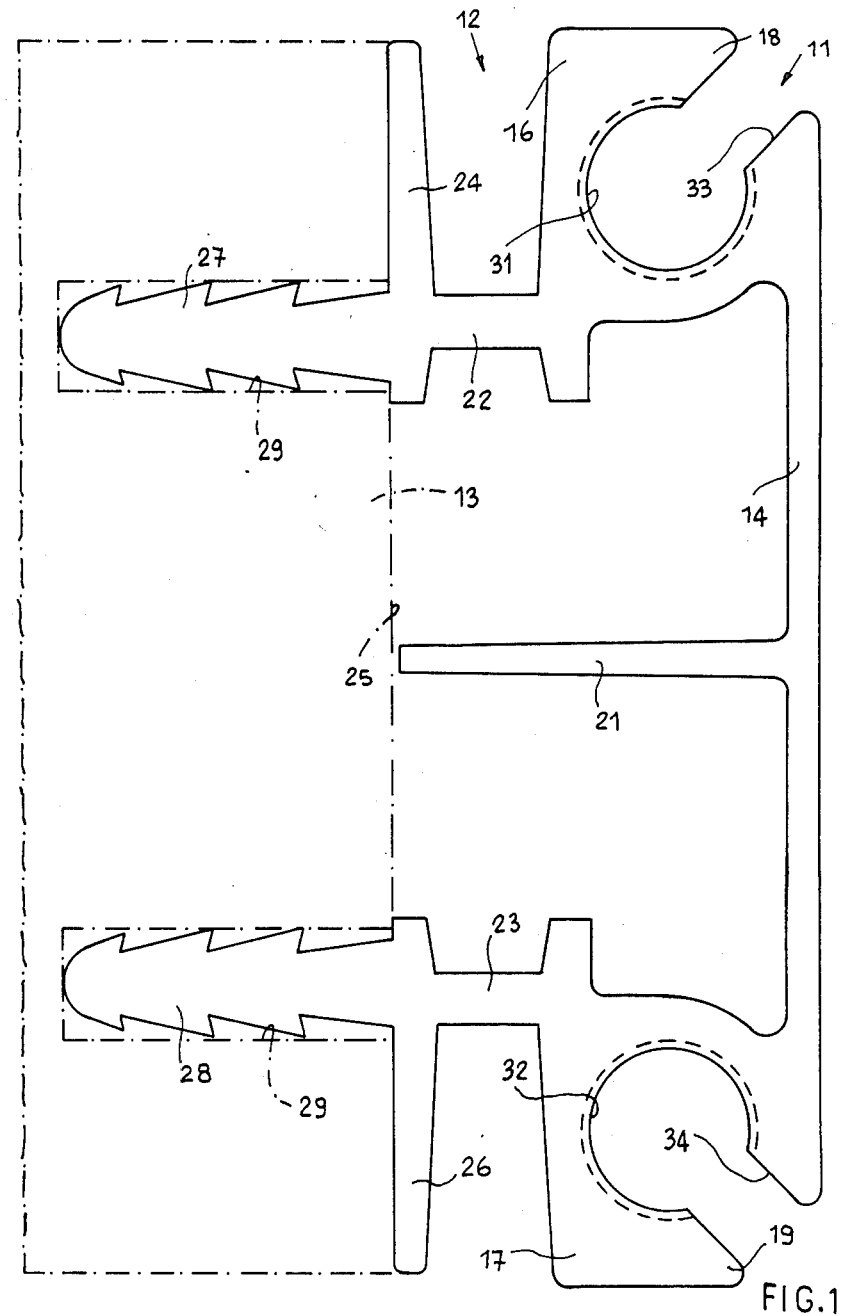
FIG. 1 is a plan view of part of the connecting arrangement for panels according to the invention, on an enlarged scale.

Referring to FIG. 1, the connecting arrangement 11 which is generally indicated by reference numeral 11 comprises a lateral upright 12 of a divider panel 13 which is formed in one shaped piece produced for example by extrusion and being of the same height as the panel 13. The upright 12 comprises a flat outside wall portion 14 integral with two side wall portions 16 and 17 parallel to each other and perpendicular to the outside wall portion 14, defining two corners 18 and 19, two internal strip portions 22 and 23 parallel to the wall portions 16 and 17, and two external strip portions 24 and 26 parallel to the wall portion 14, which define the surface for fixing of the upright to an edge 25 of the panel 13, in turn being integral with two strip portions 27 and 28 bearing sawtooth configurations. The edge 25 of the panel 13 is provided with longitudinal grooves 29 in which the sawtooth strip portions 27 and 28 are engaged until the edge 25 is caused to abut against the external strip portions 24 and 26. The external wall portion 14 is also integral with a strip portion 21 which projects towards the interior of the upright 12 until reaching the edge 25 of the panel 13 and acts as a stiffening means.

Each corner 18 and 19 comprises a hollow support 31 and 32 which extends over the entire length of the upright 12 and is formed by a substantially cylindrical seat having a passage 33 and 34 extending to the outside of the upright 12. Each seat 31 and 32 extends over the entire length of the upright 12 and the two ends of the seats 31 and 32 have a portion 36 and 37 respectively which is screwthreaded over a predetermined length, as shown in FIG. 3.

A shaped connecting member 41 (see FIG. 4) comprises two substantially cylindrical portions or edges 42 and 43 connected by a portion of limited thickness, formed by a plate or bar portion 40. The edges 41 and 42 are substantially identical and fixed with respect to the portion 40 and are made in one piece from plastics material, for example by extrusion. Each cylindrical edge 42 and 43 is slidably engageable into the cylindrical seats 31 and 32 (FIG. 1). The portion 40 (see FIG. 4) is slidably engageable between the outside edges of the passages 33 and 34 (see FIG. 1), which limit the axial movements of the portion 40 (see FIG. 4) and thus the connecting member 41.

Figure 7:
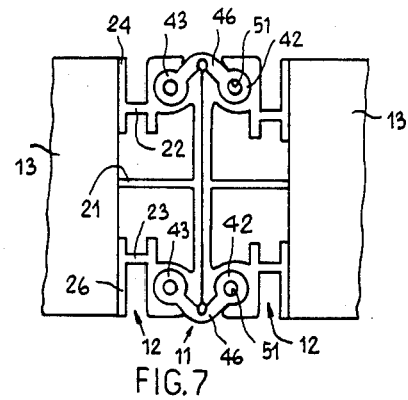
FIG. 7 is a plan view of part of a first diagrammatic configuration of panels with the arrangement shown in FIG. 1.
Figure 8:
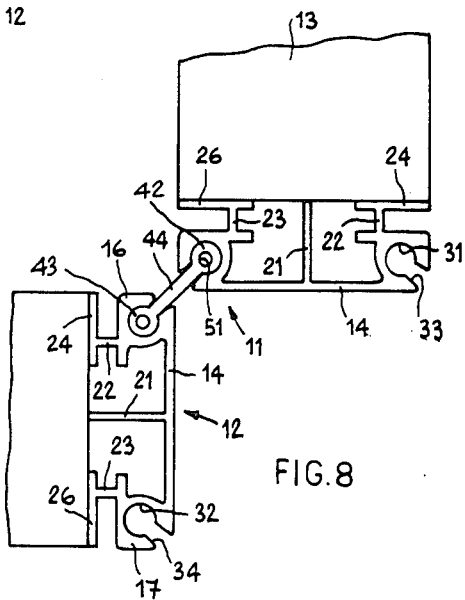
FIG. 8 is a plan view of part of a second configuration of panels with the arrangement shown in FIG. 1.
Figure 9:
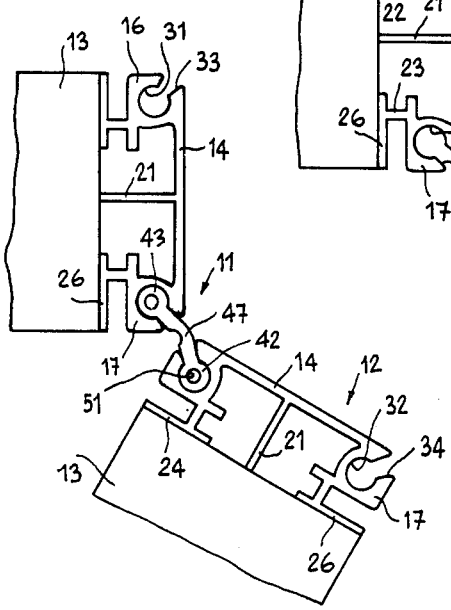
FIG. 9 is a plan view of part of a third configuration of panels with the arrangement shown in FIG. 1.

The connecting member 41 may be of the shape shown in FIG. 4 in which the portion 40 is rectilinear and is indicated by reference numeral 44, or the form shown in FIG. 5 and FIG. 6. The cylindrical portions 42 and 43 are identical but the form of the connection portion 40 varies. In the construction shown in FIG. 5, the strip or bar portion indicated by 46 forms an angle of 90° while in the construction shown in FIG. 6, the strip or bar portion indicated by reference numeral 47 is curved at 150°. The variable angle of the portion 40 permits the panels to be arranged in variable configurations. FIGS. 7, 8 and 9 show three forms of application of the connecting members 41 which permit two contiguous panels to be coplanar, as shown in FIG. 7, or disposed at 90° as shown in FIG. 8, or disposed at 120° as shown in FIG. 9.

Referring in particular to FIG. 7, housed in the two uprights 12 are two connecting members 41, the portion 46 of which is bent at 90°, while in FIG. 8 the straight portion 44 is used and the panels are disposed at 90°, and in FIG. 9 the portion 47 which is bent at 150° is employed and the panels are disposed at 120°.

The mode of operation and assembly in the three cases is substantially identical. When the position of the panels has been established: coplanar (FIG. 7), at 90° (FIG. 8) or at 120° (FIG. 9), the operator takes the corresponding connecting members 41 with the more curved portion 46, the straight portion 44 or the less curved portion 47, and fits the cylindrical portions 42 and 43 into the corresponding hollow supports 31 and 32, arranging them over the entire length of the supports 31 and 32. In order to provide a permanent structure, the connecting members 41 (FIGS. 7, 8 and 9) are provided at the ends with coaxial holes 51 co-operable with locking elements, for example screws 52 (see FIGS. 2 and 3) which are screwed into the corresponding screwthreaded portions 36 and 37 in such a way as structurally to connect the uprights 12 to the connecting members 41. The panels 13 are now rigidly connected to each other. The operator may fit a cover or edging member 53 to cover entirely the ends of the uprights 12, the panels 13 and the screws 52.

For dismantling purposes, the operator applies a slight pressure to the edging member 53 and disengages it from the uprights 12. He then unscrews the screws 52 and slides the connecting members 41 along the cylindrical seats in the uprights. The panels 13 remain free and are again ready for a fresh arrangement by means of simply changing the connecting members 41.

The connecting arrangement 11 as described hereinbefore provides a strong, compact and functional structure which fully attains the stated object of connecting panels in variable configurations.

It will be appreciated that the connecting arrangement 11 for panels 13 may be the subject of modifications and improvements both in respect to the shape and the arrangement of the various parts thereof without departing from the scope of the invention.

What I claim is:

1. A connecting arrangement for panels for defining office places in a variable configuration comprising two divider panels each having a lateral edge with two longitudinal grooves and two lateral uprights having the same height as the divider panel and a shaped connecting member which removably connects two adjacent uprights of two contiguous divider panels;

wherein each upright comprises a flat wall, two side walls parallel to each other and perpendicular to the flat wall and defining two external corners with said flat wall, two internal walls parallel to the side walls, two external walls parallel to the flat wall and which define a surface for fixing the upright to the lateral edge of the divider panels, and two sawtooth strips which are integral with the two external walls for engaging the two longitudinal grooves of the divider panels;

wherein each external corner of said upright comprises a cylindrical seat and a slot passage which are disposed on a bisector plane, intermediate with respect to said two side walls and said flat wall, wherein the slot passage extends to the outside of the upright on the edge of the external corner;

wherein said shaped connecting member comprises two cylindrical portions and a bar portion which is integral with the two cylindrical portions, wherein each of the two cylindrical portions is slidably and removably engaged into the cylindrical seat of said external corners and the bar portion is slidably and removably engaged between the outside edges of the slot passage of said external corners; and wherein said slot passages limit the axial movements of said bar portion and the variable configuration of the two contiguous divider panels.

2. A connecting arrangement according to claim 1, wherein the bar portion is flat or curved at a variable angle and thus allows two contiguous divider panels to be coplanar, perpendicular to each other or to provide other variable configurations each one defined by the form of said bar portion.

3. An arrangement according to claim 1, wherein the upright is one piece and extends over the entire height of the panel, the connecting member is also in one piece and the upright and connecting member are made from plastic rigid material.

* * * * *